R. W. J. SMITH.
POWER TRANSMITTING MECHANISM.
APPLICATION FILED MAY 9, 1919.
1,346,139.
Patented July 13, 1920.
2 SHEETS—SHEET 1.
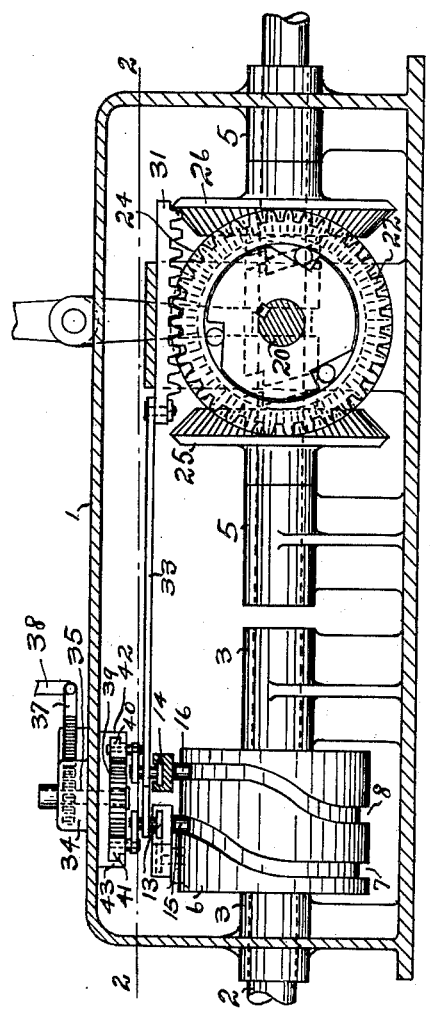
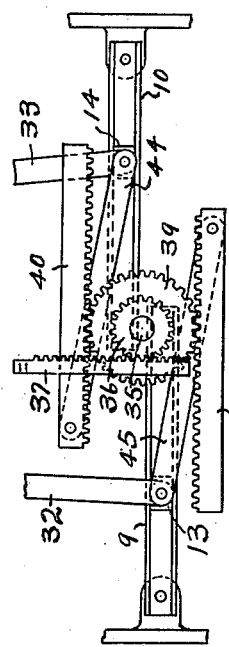
INVENTOR.
Robert W. J. Smith
BY
Hardway Cather
ATTORNEYS

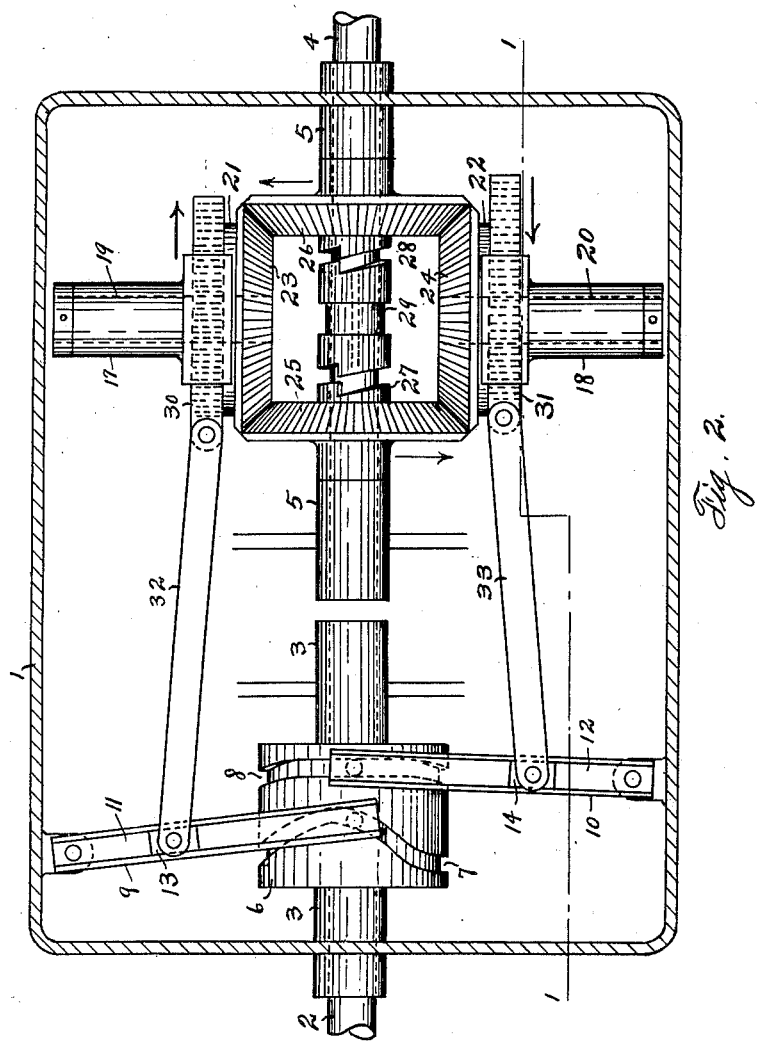

UNITED STATES PATENT OFFICE.

ROBERT W. J. SMITH, OF HOUSTON, TEXAS.

POWER-TRANSMITTING MECHANISM.

1,346,139.	Specification of Letters Patent.	Patented July 13, 1920.

Application filed May 9, 1919. Serial No. 295,983.

*To all whom it may concern:*

Be it known that I, ROBERT W. J. SMITH, a citizen of the United States, residing at Houston, in the county of Harris and State of Texas, have invented certain new and useful Improvements in Power-Transmitting Mechanism, of which the following is a specification.

One object of the invention is to provide a device of the character described, which has been designed for the purpose of connecting a driving or power shaft with a driven shaft, whereby the driven shaft is continuously rotated from the driving shaft.

Another object of the invention resides in the provision of a device of the character described, whereby the speed of the driven shaft may be varied with respect to the speed of the driving shaft, and driven in the same or the reverse direction.

With the above and other objects in view, the invention has particular relation to certain novel features of construction, operation and arrangement of parts, an example of which is given in this specification and illustrated in the accompanying drawings, wherein:

Figure 1, is a vertical sectional view taken on the line 1—1 of Fig. 2.

Fig. 2, is a transverse sectional view taken on the line 2—2 of Fig. 1, and

Fig. 3, is a plan view of the mechanism for changing the speed of the driven shaft relative to that of the driving shaft.

Referring now more particularly to the drawings wherein, like numerals of reference designate similar parts in each of the figures, the numeral 1, refers to the casing inclosing the mechanism hereinafter described. The numeral 2, designates the driving shaft which is operatively connected to and driven by a motor (not shown), said shaft being mounted for rotation in suitable bearings 3, 3, carried by said casing. The numeral 4 refers to the driven shaft which is mounted for rotation in the bearings 5, 5, carried by said casing. Fixed upon the driving shaft there is a drum 6, provided with the peripheral cam shaped grooves 7 and 8. Pivoted at their outer ends to opposite sides of the casing 1, are the arms 9 and 10, which have the dovetailed grooves 11 and 12, wherein the respective blocks 13 and 14 are slidably mounted. The inner ends of the arms 9 and 10 have the respective studs 15 and 16, secured thereto, which project into the corresponding cam shaped grooves 7 and 8, so that as the drum 6 rotates, said arms 9 and 10 will be reciprocated back and forth. Rotatably mounted in the transversely alined bearings 17 and 18, fixed within the casing, are the short transverse shafts 19 and 20, and mounted upon said shafts are the spur gears 21 and 22, arranged to be clutched with and declutched from their respective shafts 19 and 20, by means of roller clutches of any well known type such as that illustrated in Fig. 1. Fixed upon the inner ends of the respective shafts 19 and 20, are the bevel gears 23 and 24, both of which are in mesh with the oppositely disposed bevel gear wheels 25 and 26, which are loosely mounted upon the driven shaft 4, and whose inner ends are formed into clutch members 27 and 28, which are integral therewith, and splined upon said shaft between said clutch members, is the double clutch member 29, arranged to be shifted into engagement alternately with the clutch members 27 and 28. Rack members 30 and 31 are in mesh with the respective spur gear wheels 21 and 22, and the respective links 32 and 33 are pivotedly connected to the blocks 13 and 14, at one end, and at their other ends are pivotally connected to said rack members. As the drum 6 rotates, it will operate through the mechanism described to oscillate the arms 9 and 10, in sequence, in same direction, which will, in a corresponding manner, reciprocate the rack members 30 and 31 through the links 32 and 33, and simultaneously rotate the spur gears 21 and 22, back and forth. The roller clutch through which the spur gear 21 is connected to and disconnected from its shaft, is so arranged that it will clutch said spur gear with the shaft when the rack member 30 is moved backwardly in the direction indicated by the arrow in Fig. 2, and declutch the same from said shaft when said rack member is reciprocated in the opposite direction, and the clutch member through which the spur gear 22 is clutched with and declutched from its shafts is reversely arranged; that is,—is so arranged that the spur gear 22 will be clutched with its shaft when the rack member is moved forwardly in the direction indicated by the arrow indicated in Fig. 2, and will be declutched and run idle when said rack member is reciprocated in the opposite direction. As before stated, the rack members 30 and 31 are simultaneously reciprocated in opposite directions, by the cam shaped grooves 7 and 8, and are so formed that the movement of either of said rack members in any particular direction will be reversed a short time before the other rack member has finished its stroke in the opposite direction, so that the rotation imparted to the driven shaft 4 will be continuous, that is, so that the active stroke of one of said rack members will not be entirely completed before the active stroke of the other member has begun. A continuous rotation is thus imparted from the bevel gears 23 and 24 to the bevel gears 25 and 26, which are in mesh therewith, and this rotation will be transmitted to the shaft 4 in one direction when the clutch member 29 is in engagement with the clutch member 27, and in the other direction when the clutch member 29 is in engagement with the clutch member 28, so that the direction of the rotation of the shaft 4 will be reversed by shifting the clutch member 29, thus giving forward and reverse rotations.

It is obvious that the length of the stroke of the rack members 30 and 31 may be varied by shifting the blocks 13 and 14, and the speed of rotation imparted to the shaft 4, thus varied. When said blocks are shifted toward the inner ends of the arms 9 and 10, a longer stroke of the rack members 30 and 31, and consequently a higher rate of speed will result, and when said blocks are shifted toward the outer ends of said arms, the reverse will be accomplished. For the purpose of shifting these blocks, and changing the speed, a mechanism has been devised which will now be described.

Rotatably mounted in a suitable bearing 34, carried by the top of the casing 1, is a vertical shaft 35, fixed upon which, there is a relatively small spur gear wheel 36, and in mesh therewith, there is a rack member 37, arranged to be reciprocated through a suitable lever 38, and the shaft 35 thereby rotated. Fixed to the lower end of the shaft 35, there is a relatively large spur gear wheel 39, arranged upon opposite sides of which and in mesh therewith, are the rack members 40 and 41, which are slidable in oblong bearings 42 and 43. These rack members are connected to the respective blocks 13 and 14, through the links 44 and 45. It is obvious that when the rack member 35 is shifted in one direction, it will operate through the mechanism described to actuate the rack members 40 and 41, and to move the blocks 13 and 14, inwardly toward each other, thus increasing the length of the stroke of the rack members 30 and 31, and when shifted in the opposite direction, the reverse will be true and said blocks 13 and 14 will be moved outwardly thus shortening the stroke of the said rack members 30 and 31, and correspondingly varying the speed.

What I claim is:

1. The combination with a driving shaft, of a driven shaft, a mechanism operatively connected with and adapted to drive said driven shaft, means through which said mechanism may be connected to the shaft so as to drive it in either direction, a pair of oscillating arms, a pair of cams fixed upon and rotated by the driving shaft, and in operative connection with said arms, and through which the arms are oscillated, a link having a slidable connection at one end with each arm, a pair of rack members in operative connection with said mechanism, and to which the other ends of said respective arms are pivoted, said rack members being operatively connected with said mechanism, and alternately actuating the same continuously to impart a continuous rotation through said mechanism to said driven shaft.

2. The combination with a driving shaft, of a driven shaft, a mechanism operatively connected with and adapted to drive said driven shaft, means through which said mechanism may be connected to the shaft so as to drive it in either direction, a pair of oscillating arms, a pair of cams fixed upon and rotated by the driving shaft, and in operative connection with said arms, and through which the arms are oscillated, a link having a slidable connection at one end with each arm, a pair of rack members in operative connection with said mechanism, and to which the other ends of said respective arms are pivoted, said rack members being operatively connected with said mechanism, and alternately actuating the same continuously to impart a continuous rotation through said mechanism to said driven shaft, and means for adjusting the connections of said links with said arms.

3. The combination with a driving shaft, of a driven shaft, a mechanism operatively connected with and adapted to drive said driven shaft, means through which said mechanism may be connected to the shaft so as to drive it in either direction, a pair of oscillating members, a pair of cams fixed upon and rotated by the driving shaft, and in operative connection with said members and through which the same are oscillated, a connecting member having a slidable connection at one end with each oscillating member, a pair of rack members in operative connection with said mechanism, and to which the other ends of said respective oscillating members are pivoted, said rack members being operatively connected with said mechanism, and alternately actuating the same continuously to impart a continuous rotation through said mechanism to said driven shaft.

In testimony whereof I have signed my name to this specification.

ROBERT W. J. SMITH.